(12) United States Patent
Huang et al.

(10) Patent No.: US 6,519,731 B1
(45) Date of Patent: Feb. 11, 2003

(54) ASSURING SEQUENCE NUMBER AVAILABILITY IN AN ADAPTIVE HYBRID-ARQ CODING SYSTEM

(75) Inventors: Dongjie Huang, Plano, TX (US); Jianxu Shi, Dallas, TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/426,059

(22) Filed: Oct. 22, 1999

(51) Int. Cl.[7] .......................... H03M 13/00; H04J 3/16; H04J 3/24
(52) U.S. Cl. .................. 714/751; 370/471; 370/474
(58) Field of Search .................. 370/395, 506, 370/912, 392–394, 471, 474–476; 714/746–751

(56) References Cited

U.S. PATENT DOCUMENTS

| 5,828,677 A | * 10/1998 | Sayeed et al. | 714/708 |
| 6,163,861 A | * 12/2000 | Yoshioka et al. | 375/219 |
| 6,359,877 B1 | * 3/2002 | Rathonyi et al. | 370/232 |

FOREIGN PATENT DOCUMENTS

EP    0 797 327 A2    3/1997

OTHER PUBLICATIONS

Sorour Falahati and Arne Svensson; "Hybrid Type–II ARQ Schemes for Rayleigh Fading Channels"; Unknown date; 5 pages with 5 pages attached.

* cited by examiner

Primary Examiner—Albert Decady
Assistant Examiner—Cynthia Britt
(74) Attorney, Agent, or Firm—Jenkens & Gilchrist, P.C.

(57) ABSTRACT

A system, method, and apparatus for assuring the availability of packet sequence numbers in an adaptive hybrid-ARQ coding scheme are presented. In a hybrid-ARQ coding scheme with multiple forward error correction (FEC) rates, a parameter is defined based on the highest data rate and the lowest data rate, whereby the parameter, N, is equivalent to the number of packets required to retransmit a packet which was initially transmitted at the highest FEC rate now at the lowest FEC rate. A header module which assembles the packet headers increments the packet number of packets in sequential increments which assure the availability of N sequence numbers. The availability of N sequence numbers permits the coding sequence to retransmit a packet using the lowest FEC rate without disrupting the sequential ordering of each packet.

12 Claims, 2 Drawing Sheets

ASSURING SEQUENCE NUMBER AVAILABILITY IN AN ADAPTIVE HYBRID-ARQ CODING SYSTEM

FIELD OF THE INVENTION

The present invention relates to the field of mobile radio communications systems, and, more particularly, to the problem of increasing the quality of a wireless transmission without substantially decreasing the overall throughput of the communications channel.

BACKGROUND OF THE INVENTION

Mobile radio channels are often characterized by the unpredictability of the channel due to, inter alia, Rayleigh fading and long term shadow fading. The channel quality may degrade as a result of several factors, such as, for example, co-channel interference adjacent channel interference propagation path loss, and multi-path propagation (i.e., Rayleigh fading). Transmission errors typically occur in bursts when fading causes the signal level to go below the noise or interference level. Therefore, explicit measures often need to be taken to maintain an acceptable level of quality of the transmission over a radio channel.

The quality of the transmission over a radio channel connection may be measured by the reliability with which the receiver receives the transmitted data. This channel reliability may, for example, be defined in terms of the bit-error-rate (BER) as experienced at the receiver.

Specifically, forward error correction (FEC) and automatic repeat request (ARQ) are two well-known error control techniques commonly used for noisy and fading channels. In a system that uses FEC for error control, for example, the transmitter encodes the data using a given redundancy code, while the receiver, which has been informed of the code used, decodes the data at the receiving end. Many such systems using block or convolutional codes have been explored and/or employed. In a system that uses ARQ, for example, the receiver returns (i.e., transmits back to the transmitter) an acknowledgment which indicates whether the given transmitted packet was received free of errors (in which case an acknowledgment signal, or "ACK" is sent), or whether it was received erroneously (in which case a negative acknowledgment signal, or "NACK" is sent). If the packet was not received error-free (i.e., if the transmitter receives back a "NACK" signal), the transmitter then re-transmits the same packet again, anticipating that the packet will be successfully received on this (or else on a further, subsequent) transmission.

Transmission of multimedia applications such as high quality audio, images and real-time video, for example, require very low bit-error-rates—typically $10^{-6}$ or less. obtaining such low BERs in wireless environments is challenging, even in the presence of very low rate forward error correction codes. ARQ techniques, however, provide very reliable communication, albeit at the expense of variable and sometimes large delays. However, hybrid ARQ schemes, in which both FEC and ARQ techniques are employed simultaneously, are particularly attractive because they combine the fixed delay error correction capability of FEC techniques with the low BER of basic ARQ schemes.

The performance gains obtained from an FEC technique depends on the state of the channel. For example, when the received signal-to-noise (SNR) is large, an uncoded system or a high code rate FEC is sufficient to give a satisfactory BER. On the other hand, for lower received SNRs, a very low rate FEC may be necessary to meet the requirements. Adaptive hybrid ARQ schemes can be used in channels with varying BERs, wherein a high rate FEC is used during times when lower BERs are experienced and a low rate FEC is used during times when higher BERs are experienced. In comparison to non-adaptive hybrid ARQ schemes, adaptive schemes employ fewer bits for error correction. Therefore, these adaptive schemes typically result in a better overall throughput than do non-adaptive schemes.

In an adaptive hybrid ARQ, a retransmitted packet may need more redundancy (i.e., a lower coding rate) than the first time sent packet when the channel condition is deteriorating in the retransmission. Since each packet can only carry a fixed number of bits, the information in the corrupted packet may need to be transmitted in more than one packet when a lower coding rate with more overhead is needed in the retransmission.

Traditionally, packets are numbered consecutively based on their transmitted orders and the sequence number for the retransmitted packet is the same as that for the original packet. Such a packet numbering scheme will create problems for an adaptive hybrid-ARQ with selective retransmission, since the original packet may be divided into multiple packets for the retransmission. Where the original packet is divided into multiple packets, there will be a shortage of sequence numbers for the extra packets generated due to the change of coding rate. In an adaptive hybrid-ARQ scheme known as the "go-back-N" protocol, the corrupted packet, as well as each packet after it, are retransmitted. The foregoing approach, however, reduces channel throughout since properly received packets are unnecessarily retransmitted.

Accordingly, it would be advantageous if the availability of sequence numbers could be assured while selectively retransmitting only corrupted packets in an adaptive hybrid-ARQ coding scheme.

SUMMARY OF THE INVENTION

The present invention is directed to a system, method, and apparatus for assuring the availability of sequence numbers in an adaptive hybrid automatic repeat request coding system capable of multiple forward error correction (FEC) rates. Each batch of data received from a data source is assembled into a packet with a header containing a packet number. The packet numbers are incremented by at least the ratio of the amount of data which can be transmitted in the packet using the highest FEC rate and the amount of data which can be transmitted in the packet using the lowest FEC rate.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
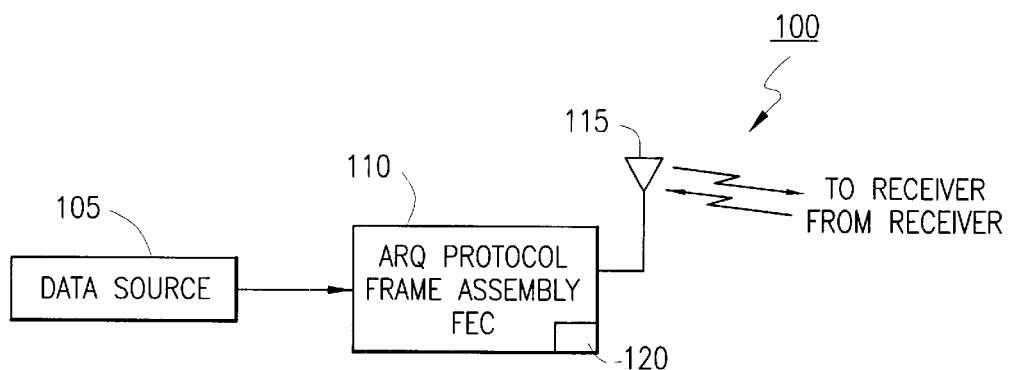
FIG. 1 is a block diagram of an adaptive hybrid-ARQ system configured in accordance with the present invention.

Referring now to FIG. 1, there is illustrated a block diagram of an adaptive hybrid-ARQ system, generally designated by the numeral 100, configured in accordance with the present invention. The adaptive hybrid-ARQ system 100 includes a data source 105 which provides data to a frame assembly module 110, which transmits packets of the data using a transceiver 115, as discussed hereinabove. Additionally, the transceiver 115 also receives an acknowledgment from another transceiver, which indicates whether a given transmitted packet was received free of errors (in which case an acknowledgment signal, or "ACK" is sent), or whether it was received erroneously (in which case a negative acknowledgment signal, or "NACK" is sent). If the given packet was not received error-free (i.e., if the transmitter receives back a "NACK" signal), the transceiver 115, then re-transmits that same packet again, anticipating that the given packet will be successfully received on this (or else on a further, subsequent) transmission.

Figure 2:
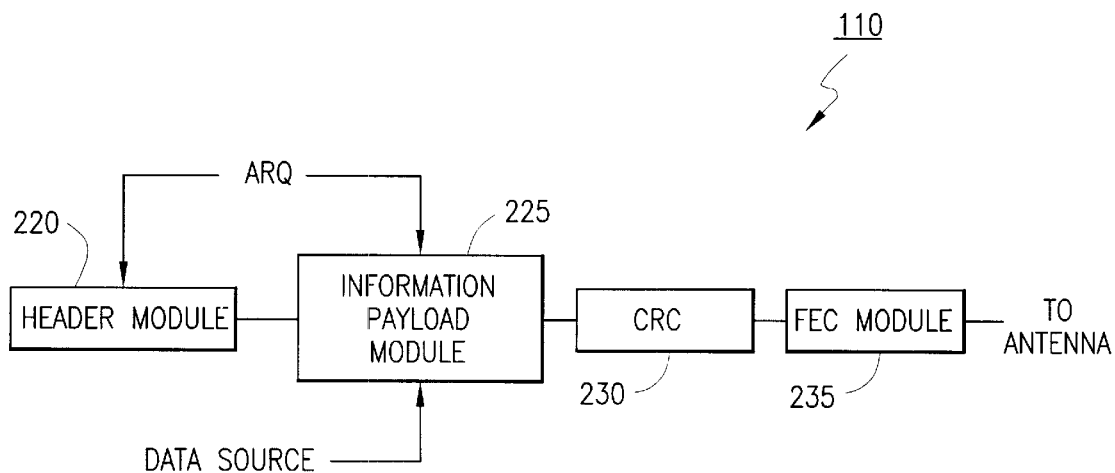
FIG. 2 is a block diagram of a frame assembly module of FIG. 1 in accordance with the present invention.

Referring now to FIG. 2, there is illustrated a block diagram of various components of the aforementioned frame assembly module 110 of the adaptive hybrid-ARQ system 100 shown in FIG. 1 in accordance with the present invention. As shown in FIG. 2, the frame assembly module 110 includes a header module 220 for generating a header containing, for example, a packet number for identifying the packet. The particular data for transmission is received by a data source and incorporated in the packet by an information payload module 225. Error detection is then performed by a Cyclic-Redundancy-Check module 230 followed by forward error correction (FEC) done by an FEC module 235.

It should be understood that the particular FEC rate implemented by the FEC module 235 depends upon the state of the channel. Accordingly, when the received signal-to-noise ratio (SNR) is large, the FEC module 235 uses a high code rate FEC to give a satisfactory BER, and for lower received SNRs, a very low rate FEC is used by the FEC module 235.

Deteriorating channel conditions may require a lower FEC rate for a retransmitted packet than the first time the packet was sent. Since each packet can only carry a fixed number of bits, the information in the corrupted packet may need to be transmitted in more than one packet when a lower FEC rate with more overhead is needed in the retransmission. To assure the availability of sequence numbers while selectively retransmitting corrupted packets in an adaptive hybrid-ARQ coding scheme, the present invention proposes the following numbering scheme for the header module 220.

Figure 3:
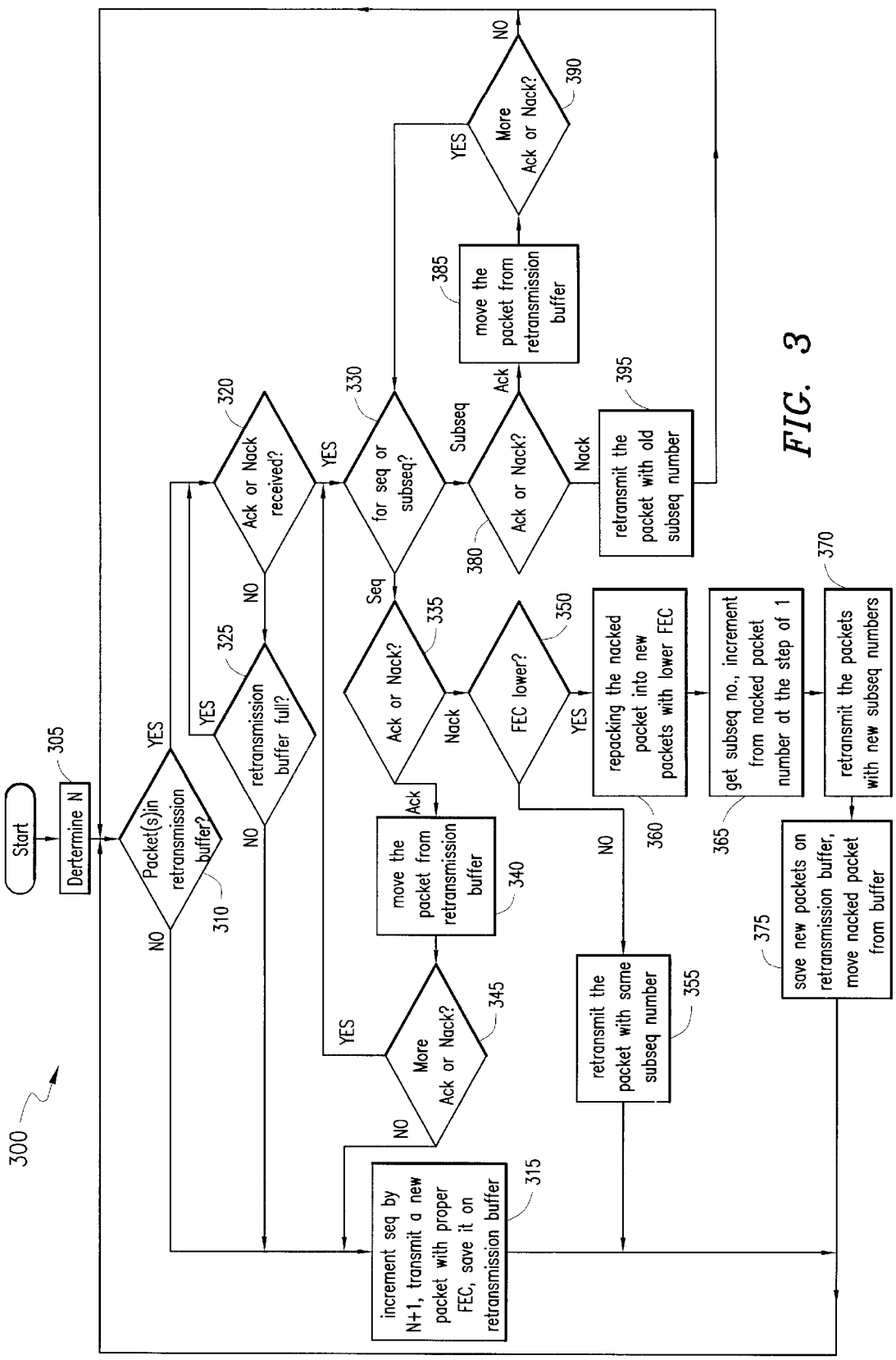
FIG. 3 is a flow chart diagram describing a presently preferred operation of the adaptive hybrid-ARQ system with selective retransmission in accordance with the present invention.

Referring now to FIG. 3, there is a flow diagram describing a presently preferred operation of the adaptive hybrid-ARQ system 100 in accordance with the present invention. After starting, the method of the present invention determines (at step 305) a parameter N using, for example, the following formula:

$$N = \text{ceiling}(D_H/D_L)+1,$$

where $D_H$=Data per Packet using Highest FEC Rate, and
$D_L$=Data per Packet using Lowest FEC Rate It should be understood that the worst case scenario occurs when a data packet transmitted using the highest FEC rate must be retransmitted using the lowest FEC rate. Since each packet can only carry a fixed number of bits therein, using the above formula the information in the corrupted packet requires a maximum of N packets to retransmit. Accordingly, if the transmitted packets are numbered in increments of N, the availability of unique sequence numbers is assured. However, where a single packet is retransmitted using more than one packet, then the packet number used for the erroneously received packet should not be used, thereby preventing the receiver from mistaking the first of the retransmitted packets as a complete retransmission. Thus, to assure the availability of sequence numbers without reusing a packet number for an erroneously transmitted packet, the packets numbers should instead be transmitted in increments of N+1.

With reference again to FIG. 3, at step 310, a determination is made whether there are any packets of data in a retransmission buffer 120 (shown in FIG. 1). All packets of data that are transmitted are saved on the retransmission buffer 120 afterward, and removed therefrom if an ACK is received. It should be understood, however, that the size of the retransmission buffer 120 is limited and preferably equals that of a receiver buffer. If there is no data in retransmission buffer 120, control transfers to box 315, in which a sequence number (seq) is incremented by N+1, which provides a unique identifier for the data packet. It should be understood that the seq is the number of the packet being transmitted the first time or retransmitted without changing the FEC scheme. Pursuant to the preferred embodiment, the seq has sequential values 1, 1+(N+1), 1+2(N+1), etc. With reference again to box 315, the packet (s) are transmitted with the proper FEC and again saved on the retransmission buffer 120, upon which control reverts back to box 310.

If there is packet data residing within the retransmission buffer 120, control transfers to box 320 in which a determination is made whether an ACK or NACK has been received. If no, control transfers to box 325 in which a determination is made whether the retransmission buffer 120 is full. If affirmative, control reverts back to box 320 to again determine if an acknowledgment (or non-acknowledgment) has been received. From box 325, if the buffer is not full, control transfers to box 315, as described above. If an ACK/NACK has been received, control transfers to box 330 for switching between a seq, as described hereinabove, or a subseq, which it should be understood represents a subsequence number for a packet being retransmitted with a lower FEC scheme, e.g., a packet sequence divided into up to N subsequences.

It should be understood that a proper FEC is chosen for each packet transmitted the first time. In other words, in the methodology portrayed in FIG. 3 the packet only changes FEC scheme at the first retransmission if the FEC is lower and the FEC will not be changed in further retransmissions. It should further be understood that the FEC may be updated whenever necessary in the retransmissions.

If the packet has a seq number, a determination is made (box 335) whether an ACK or a NACK was received. If an ACK (box 340), then that packet (seq) was properly received and is removed from the retransmission buffer 120, and a further determination made (box 345) whether additional ACKs or NACKs are received. If yes, control reverts to box 330, and if no, control transfers to box 315, as described hereinabove. If a NACK was received (box 335), a determination is made whether the FEC is now lower (box 350).

If no, then the identical packet may be retransmitted with the same seq number since there is no confusion (box 355), whereupon control reverts to box 310. If, however, the FEC is lower in box 350, then the nacked packet must be repacked into new packets with the lower FEC (box 360), and the subseq number incremented from the nacked packet number, e.g., 1, 1+(N+1), 1+2(N+1), etc. (box 365). The repacked packets are then transmitted with these new subseq numbers, e.g., N+2, N+3, ... 2N+2, which are unique (box 370), and saved on the retransmission buffer 120 where the nacked packet stored thereon can be removed (box 375). Control then reverts to box 310.

With reference to box 330 in FIG. 3, if the acknowledged signal is for a subseq, control transfers to box 380 in which a determination is made whether the signal is an ACK or a NACK. If an ACK, control transfers to box 385, indicating successful receipt of that packet, which can now be removed from the retransmission buffer 120. If any further ACKs or NACKs are received (box 390), control reverts to box 330; otherwise, control reverts to box 310. If a NACK is received at box 380, control transfers to box 395 in which the packet with the old subseq number on the retransmission buffer 120 is retransmitted. Control then reverts to box 310, as described hereinbefore.

The foregoing method is better understood with the following illustrative example which will be described in connection with FIG. 3. In the present example, the worst case scenario will be demonstrated in a system using a packet size of 1024 bytes with the highest FEC rate at 128 bytes and the lowest FEC rate of 512 bytes. The worst case scenario occurs when a packet transmitted with the highest FEC rate is erroneously received and must be retransmitted at the lowest FEC rate. At step 305, the parameter N is determined. Given a packet size of 1024 bytes, the data rate using the highest FEC rate, $D_H$, is 896 bytes (1024−128 bytes), i.e., the number of available bytes for the data is reduced by the 128 bytes used for FEC, while the data rate using the lowest FEC rate, $D_L$, is 512 bytes (1024−512 bytes)

Therefore:

$$N=\text{ceiling}(D_H/D_L)+1;$$

$$N=\text{ceiling}(896/512)+1;$$

$$N=2$$

Accordingly, by incrementing the packet numbers by N+1, or 3, the availability of sequence numbers is assured in the worst case scenario without reusing the sequence number of an erroneously received packet.

With reference again to FIGS. 1 and 2, data is received from data source 105 by the information payload module 225. The header module 220 increments the packet number by N+1, or 3, and creates a header for the packet. Where the numbering sequence begins with 0, the packet number for the packet would be 3. The data and the header are assembled into a packet by the addition of CRC by the CRC module 230 and FEC by the FEC module 235 and transmitted by the transceiver 115. In a worst case scenario, the FEC rate would be the highest FEC rate, or 128 bytes, corresponding to 896 bytes of data.

After transmitting the packet, the transceiver receives (step 320) acknowledgment data from the receiver which indicates whether the packet was received error-free. In the worst case scenario, the acknowledgment data indicates erroneous reception, and the packet received erroneously must be retransmitted at a lowest FEC rate (512 bytes), or a lower FEC rate than the initial FEC rate (during step 350). The erroneously received packet contained 896 bytes, however, using 512 bytes of FEC in a 1024 byte packet allows only 512 bytes of the actual data to be transmitted per packet. Therefore, the data cannot now be retransmitted in a single packet and must be repacked and retransmitted using multiple packets (step 360). Accordingly, the maximum amount of the data which can be transmitted in a single packet (512 bytes) is partitioned (step 360) by the information payload module 225, and a header is created by the header module 220. However, instead of incrementing by N+1, as in step 315, the header module 220 increments the packet number by one (step 365), giving a packet number of 4. The packet is then assembled and transmitted (step 375).

A determination is made whether the packet transmitted packet completed transmission of all the data in the erroneously received packet. In the example, because only 512 bytes of 896 bytes of data were transmitted, the packet was not a complete transmission of all the data in the erroneously received packet.

Accordingly, the remaining 384 bytes are gathered by the information payload module 225. The header module 220 increments the packet number by one, giving a packet number of 5. The packet is then assembled (step 360) and transmitted (step 370).

At step 310, the next batch of data is gathered by the information payload module 225 and a header is created by incrementing the packet number 3, by N+1, giving a packet number of 6. Steps 325–395 are then repeated where applicable for the foregoing batch of data, and each successive batch of data.

Although the invention has been described with a certain degree of particularity, it should be recognized that elements thereof may be altered by persons skilled in the art without departing from the spirit and scope of the invention. Therefore, the invention is limited only by the following claims and their equivalents.

What is claimed is:

1. In an adaptive hybrid automatic repeat request coding system, a method of transmitting a plurality of data packets, said method comprising the steps of:

receiving a first batch of data from a data source, said first batch of data containing therein received data and error correction data, the amount of error correction data in said first batch varying between at least a first and a second mode, the amount of error correction data in a given batch in said first mode exceeding the amount of error correction data in said given batch in said second mode;

incrementing a packet number by an increment factor, said increment factor being associated with a ratio of (1) the difference between a packet data capacity number and the amount of error correction data in said second mode, and (2) the difference between said packet data capacity number and the amount of error correction data in said first mode;

assembling at least a portion of said received data, error correction data corresponding to said at least a portion of said received data, and said packet number into a given packet; and transmitting said given packet to a receiver.

2. The method of claim 1, wherein said incrementing step further comprises the step of incrementing said packet number by N, wherein:

$$N=\text{ceiling}(D_H/D_L);$$

$D_H$=difference between the predetermined amount of data and the amount of error correction in said first mode; and $D_L$=difference between the predetermined amount of data and the amount of error correction in said second mode.

3. The method of claim 1, further comprising the step of:
receiving a signal from said receiver said signal indicating whether said receiver received said packet correctly or erroneously.

4. The method of claim 3, wherein said assembling step further comprises the step of:
assembling said first batch of data, said packet number, and said amount of error correction data in said second mode.

5. The method of claim 4, further comprising the step of:
incrementing said packet number by one, wherein said signal indicates that said receiver has erroneously received said packet.

6. The method of claim 4, further comprising the step of:
assembling a second batch of data, said second batch of data forming a portion of said first batch of data, and said amount of error correction data in said first mode into another packet.

7. An adaptive hybrid automatic repeat request coding system for transmitting data packets containing a predetermined amount of data, said adaptive hybrid automatic repeat request system comprising:
a data source for providing data for transmission within at least one of said data packets;
an error correction module for adding error correction data to said packets, said error correction module adding a first quantity of error correction data in a first mode and a second quantity of error correction data in a second mode, said first quantity of error correction data exceeding said second quantity of error correction data; and
a header module for creating a header for said data packet, said header comprising a packet number, and wherein said header module increments said packet number by at least a certain factor, said certain factor equivalent to ratio of the difference between the predetermined amount of data and the second quantity of error correction data and the difference between the predetermined amount of data and the first quantity of error correction.

8. The adaptive hybrid automatic repeat request system of claim 7, wherein said header module increments said packet number by N, wherein:

$N=\text{ceiling}(D_H/D_L);$ $D_H$=difference between the predetermined amount of data and the second quantity of error correction data; and $D_L$=difference between the predetermined amount of data and the first quantity of error correction data.

9. The adaptive hybrid automatic repeat request system of claim 7, further comprising a first antenna for transmitting said packet to a receiver.

10. The adaptive hybrid automatic repeat request system of claim 9, wherein said first antenna receives a signal from said receiver, said signal indicating whether said receiver received said packet correctly or erroneously.

11. A header module for creating headers for packets transmitted by an adaptive hybrid automatic repeat request coding system, said header module operable to:
increment a packet number by an increment factor, said increment factor being associated with a ratio of (1) the difference between a predetermined packet data capacity number and an amount of error correction data in a first mode, and (2) the difference between said predetermined packet data capacity number and an amount of error correction data in a second mode, wherein said amount of error correction data in said second mode exceeds the amount of error correction data in said first mode.

12. The header module of claim 11, wherein said header module is further operable to:
increment said packet number by N, wherein:

$N=\text{ceiling}(D_H/D_L);$ $D_H$=difference between the predetermined amount of data and the amount of error correction data in said first mode; and $D_L$=difference between the predetermined amount of data and the amount of error correction data in said second mode.

* * * * *